J. S. Ostrander,
Drinking Cup,
№ 35,777. Patented July 1, 1862.

Witnesses:
Peter Smith
Daniel G. Staley.

Inventor:
James S. Ostrander

UNITED STATES PATENT OFFICE.

JAMES S. OSTRANDER, OF ALBANY, NEW YORK.

IMPROVED DRINKING-CUP.

Specification forming part of Letters Patent No. 35,777, dated July 1, 1862.

*To all whom it may concern:*

Be it known that I, JAMES S. OSTRANDER, of the city and county of Albany, and State of New York, have invented a new and useful Improvement on a Drinking-Cup; and I do hereby declare that the following is a full, clear, and exact description of the same, together with its construction and operation, reference being had to the annexed drawings, making a part of this specification, in which—

Figure 1:
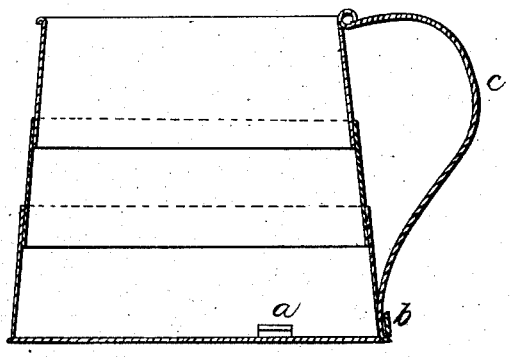
Figure 2:
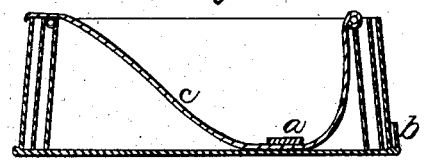
Figure 3:
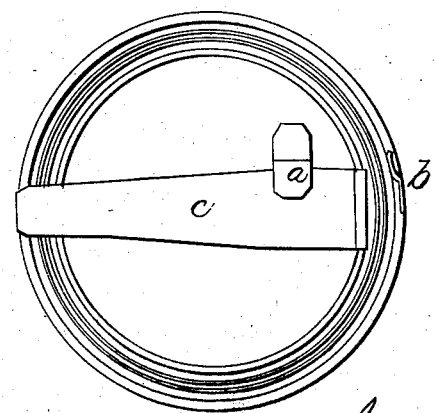

Figure 1 is a perspective view. Fig. 2 is a longitudinal elevation. Fig. 3 is a transverse sectional view.

Letter $a$ is the catch on inside of bottom to secure the handle. Letter $b$ is the catch on outside to secure the handle, thereby keeping the sections in a firm position. Its mode of management and operation is as follows, viz: By taking hold of the handle (when the cup is closed) on the inside and turning the outside will relieve it from the catch $a$. Then extend the sections and turn the handle over to the outside, and by turning the lower portion of cup will bring the end of the handle under the catch $b$.

The cup may be made of any size and material desired.

I claim—

In combination with the cup, the handle and catch on the inside and the catch on the outside, and the whole arranged substantially as and for the purpose specified.

Dated Albany, January 15, 1862.

JAMES S. OSTRANDER.

Witnesses:
PETER SMITH,
DANIEL G. STALEY.